United States Patent
Agarwal et al.

(10) Patent No.: US 9,753,788 B2
(45) Date of Patent: Sep. 5, 2017

(54) EXTENSIBILITY OF ENGINES IN COMPUTING SYSTEMS

(71) Applicant: Microsoft Technology Licensing, LLC, Redmond, WA (US)

(72) Inventors: Huma Agarwal, Hyderabad (IN); Prateek Rajvanshi, Delhi (IN); Niraj Yadav, Rajasthan (IN); Kartheek Reddy Naini, Hyderabad (IN); Anshuman Ansu, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 14/791,904

(22) Filed: Jul. 6, 2015

(65) Prior Publication Data

US 2017/0010926 A1   Jan. 12, 2017

(51) Int. Cl.
  G06F 9/54    (2006.01)
  G06Q 30/02   (2012.01)
  G06F 3/048   (2013.01)

(52) U.S. Cl.
  CPC .............. G06F 9/54 (2013.01); G06F 3/048 (2013.01); G06Q 30/0283 (2013.01)

(58) Field of Classification Search
  CPC ........................................................ G06F 9/54
  See application file for complete search history.

(56) References Cited

U.S. PATENT DOCUMENTS

| 7,454,367 | B2 | 11/2008 | Yu et al. | |
| 7,739,325 | B1* | 6/2010 | Okita | H04M 3/51 |
| | | | | 709/200 |
| 7,966,266 | B2 | 6/2011 | Delvat | |
| 8,862,632 | B2 | 10/2014 | Ziemann et al. | |
| 2003/0023567 | A1* | 1/2003 | Berkovitz | G06Q 30/02 |
| | | | | 705/400 |
| 2004/0083158 | A1* | 4/2004 | Addison | G06Q 40/04 |
| | | | | 705/37 |
| 2006/0100912 | A1* | 5/2006 | Kumar | G06F 17/30864 |
| | | | | 705/4 |
| 2007/0006237 | A1* | 1/2007 | Ghanaie-Sichanie | G06F 9/546 |
| | | | | 719/328 |
| 2007/0250840 | A1* | 10/2007 | Coker | G06F 9/54 |
| | | | | 719/320 |
| 2008/0292075 | A1 | 11/2008 | Pathos et al. | |
| 2010/0332345 | A1 | 12/2010 | Mohr et al. | |
| 2011/0154302 | A1* | 6/2011 | Balko | G06F 8/10 |
| | | | | 717/140 |
| 2012/0023162 | A1* | 1/2012 | Ott | G06F 9/54 |
| | | | | 709/203 |

(Continued)

OTHER PUBLICATIONS

"Use Custom Pricing for Products", Retrieved on: Mar. 2, 2015 Available at: https://msdn.microsoft.com/en-us/library/dn817885.aspx.

(Continued)

*Primary Examiner* — Brian W Wathen

(74) *Attorney, Agent, or Firm* — Christopher J. Volkmann; Kelly, Holt & Christenson, PLLC

(57) ABSTRACT

An extensibility system exposes an application programming interface (API) that can be used to call external engines. A given engine is identified, and triggers for calling the identified engine are monitored. When a trigger occurs, the identified engine is called through the API.

15 Claims, 8 Drawing Sheets

(56) References Cited

U.S. PATENT DOCUMENTS

| | | | |
|---|---|---|---|
| 2012/0036089 A1 | 2/2012 | Washington et al. | |
| 2013/0124264 A1 | 5/2013 | Raman et al. | |
| 2013/0198733 A1* | 8/2013 | Farrell | G06F 9/44526 717/173 |
| 2014/0172618 A1 | 6/2014 | Lewis et al. | |
| 2014/0173448 A1* | 6/2014 | Aly | G06F 8/34 715/738 |
| 2015/0012924 A1* | 1/2015 | Liu | G06F 9/542 719/318 |
| 2016/0127358 A1* | 5/2016 | Engelking | H04L 63/0861 713/156 |

OTHER PUBLICATIONS

"Integrating with Communications Billing Systems: A CRM for Communications Solution", In White Paper, Mar. 2, 2015, 24 pages.

Bradford, David, "Five Benefits of Moving Pricing Into Your CRM Application", Published on: Jan. 4, 2010, Available at: http://www.destinationcrm.com/Articles/Web-Exclusives/Viewpoints/Five-Benefits-of-Moving-Pricing-Into-Your-CRM-Application-48032.aspx.

Walia, Sandeep, "Enabling Commerce and Order Entry Integrated with Dynamics CRM 2011 for Your Sales and Customer Service Teams", Published on: Jul. 11, 2012 Available at: http://www.crmsoftwareblog.com/2012/07/enabling-commerce-and-order-entry-integrated-with-dynamics-crm-2011-for-your-sales-and-customer-service-teams/.

"Oracle Advanced Pricing", Retrieved on: Mar. 2, 2015, Available at: http://www.oracle.com/us/products/applications/057142.pdf.

"Inventory Management", Published on: Jul. 17, 2012, Available at: https://www.zoho.com/crm/help/inventory-management.html.

"Price Quotation Processing (in the ERP System)", Retrieved on: Mar. 2, 2015, Available at: http://fmis.minfin.bg/help/EN/67/c4cb6d105b4a178aa20a047c8b3af2/content.htm.

Written Opinion for International Patent Application No. PCT/US2016/040923, date of mailing: Dec. 1, 2016, date of filing: Jul. 5, 2016, 9 pages.

International Preliminary Report on Patentability for International Patent Application No. PCT/US2016/040923, date of mailing: Mar. 28, 2017, date of filing: Jul. 5, 2016, 10 pages.

International Search Report and Written Opinion for International Patent Application No. PCT/US2016/040923, date of mailing: Sep. 23, 2016, date of filing: Jul. 5, 2016, 12 pages.

"CrazyTechThoughts: Call an external program from MySQL trigger", bearing a date of Dec. 25, 2011, retrieved on May 30, 2017, retrieved at: <http://crazytechthoughts.blogspot.corn/2011/12/call-extemal-program-from-mysql html>, 15 pages.

"Oracle9i Application Developer's Guide-Fundamentals Release 2 (9.2)", retrieved on May 30, 2017, retrieved at <https://docs.oracle.com/cd/B10501_01/appdev.920/a96590/adg11rtn.htm#1000718>, 43 pages.

"Database trigger that communicates with an external program", bearing a date of Nov. 26, 2008, retrieved on May 30, 2017, retrieved at <https://stackoverflow.com/questions/319987/database-trigger-that-communicates-with-an- external-program>, 2 pages.

De Sanitago, John, "Salesforce Apex Trigger Best Practices", bearing a date of Nov. 4, 2012; retrieved on May 30, 2017, retrieved at <http://www.iterativelogic.com/salesforce-apex-trigger-best-practices/>, 19 pages.

Bedoya et al., "Stored Procedures, Triggers and User Defined Functions on DB2 Universal Database for iSeries" Chapters: 1-2, 4, 6, 9, and 11, IBM, bearing a date of Mar. 2004, retrieved on May 30, 2017, retrieved at <http://grail.cba.csuohio.edu/~matos/notes/cis-612/TechTopics/StoredProceduresTriggersFunctionsDB2UniversalDatabase.pdf >, 189 pages.

Bedoya Chapters, et al., "Stored Procedures, Triggers and User Defined Functions on DB2 Universal Database for iSeries", All Chapters, IBM, bearing a date of Mar. 2004, retrieved on May 30, 2017, retrieved at <http://grail.cba.csuohio.edu/~matos/notesicis-612/TechTopics/StoredProceduresTriggersFunctionsDKUniversalDatabase.pdf >, 554 pages.

* cited by examiner

EXTENSIBILITY OF ENGINES IN COMPUTING SYSTEMS

BACKGROUND

Computing systems are currently in wide use. Some computing systems use various engines or components to perform tasks for the computing system.

By way of example, some computing systems can be electronic mail systems, document management systems, hardware management systems, enterprise resource planning systems, customer relations management systems, among others. Some of these types of systems use engines that perform operations, or calculations. The output of those engines is used to perform additional control or processing steps within the computing system, itself.

The engines are often inside the computing systems, themselves. Therefore, it can be difficult to modify the processing of those engines, or to provide customized processing. This can result in systems which are relatively inflexible.

The discussion above is merely provided for general background information and is not intended to be used as an aid in determining the scope of the claimed subject matter.

SUMMARY

An extensibility system exposes an application programming interface (API) that can be used to call external engines. A given engine is identified, and triggers for calling the identified engine are monitored. When a trigger occurs, the identified engine is called through the API.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
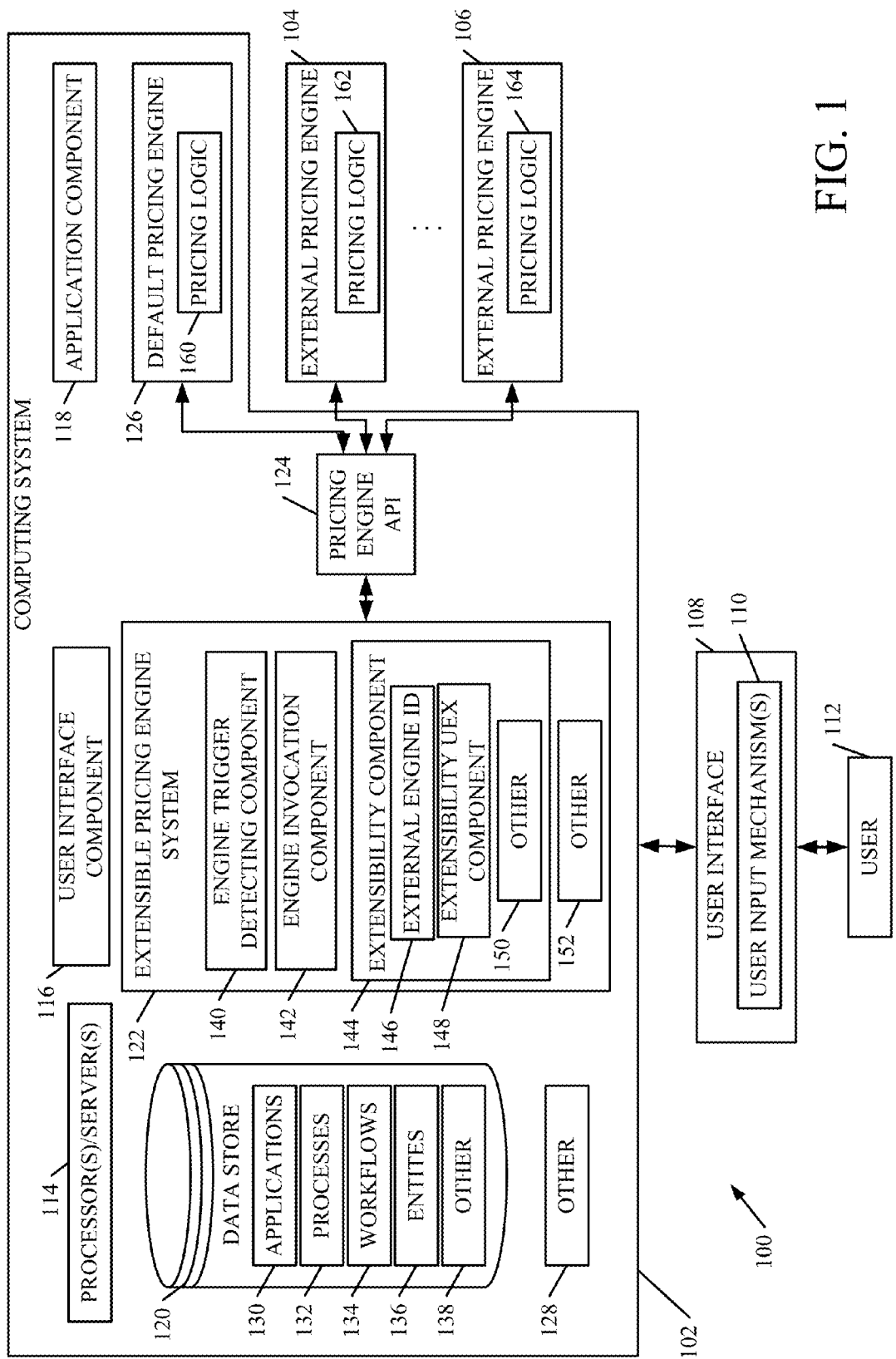
FIG. 1 is a block diagram of one example of a computing system architecture.

FIG. 1 is a block diagram of one example of computing system architecture 100. Architecture 100 illustratively includes computing system 102 that has access to one or more external engines 104-106 which, in the example shown in FIG. 1, generate processing results that are used by system 102 to perform further operations. They can, for example, be pricing engines that apply logic to generate pricing information. Computing system 102 also illustratively generates user interfaces 108 with user input mechanisms 110 for interaction by one or more users 112. Users 112 illustratively interact with user input mechanisms 110 in order to control and manipulate computing system 102. In various examples, users 112 can be end users of computing system 102, administrative users, etc.

Computing system 102 illustratively includes one or more processors or servers 114, user interface component 116, application component 118, data store 120, extensible pricing engine system 122 (which exposes pricing engine API 124), one or more default pricing engines 126, and it can include other items 128. Data store 120 can include applications 130, processes 132, workflows 134, entities 136 and a variety of other information 138.

Extensible pricing engine system 122 illustratively includes an engine trigger detecting component 140, engine invocation component 142, extensibility component 144 (which can include external engine identifier 146, extensibility user experience (UEX) component 148 and other items 150) and it can include a variety of other components, systems or items 152. Before describing the operation of architecture 100 in more detail, a brief overview will first be provided.

Application component 118 illustratively runs applications 130 which can perform processes 132 or workflows 134, and which can operate on entities or other business records 136 and 138, respectively. Entities 136 can represent a variety of items within computing system 102. For instance, a quote entity can represent and define a quote. An opportunity entity can represent and define an opportunity. An invoice entity can represent and define an invoice. A vendor entity can represent and define a vendor. These are only a small number of different types of entities 136 that can be provided in computing system 102.

The organization that uses computing system 102 may use it to assist in performing tasks, workflows, processes, etc., for the organization. In performing these tasks, it may be that end users 112 illustratively generate documents or entities that have corresponding pricing information associated with them. Thus, a default pricing engine 126, that has default pricing rules 160, can be provided with computing system 102. In that case, when pricing information is needed, default pricing engine 126 can apply default pricing rules 160 to generate pricing information corresponding to a given entity. By way of example, when a user 112 is processing an invoice entity and wishes to have updated pricing for the invoice entity, default pricing engine 126 may have rules 160 that generate pricing information as the total number of items on a given line item, multiplied by the individual unit price for that item.

It may be, however, that the organization using computing system 102 may wish to provide a certain pricing structure for various units, customers, vendors, etc. Therefore, the organization may have its own set of customized pricing logic that the organization wishes to be applied by the pricing engine used with computing system 102. In that case, extensibility UEX 148 and extensible pricing engine system 122 generates a user experience that walks an administrative user 112 through a process by which the administrative user 112 can specify an external pricing engine 104-106, with its own customized pricing logic 162-164, to be deployed whenever a pricing engine operation is triggered within computing system 102. The external engine may be identified using an external engine identifier 146 that identifies the external engine in extensibility component 144. Then, during runtime, engine trigger detecting component 140 detects when the operation of a pricing engine has been triggered, and engine invocation component 142, in response, accesses the external engine ID 146 to be accessed and makes a call to that external engine through pricing engine API 124. The external engine performs the pricing calculation operations and returns results through pricing engine API 124 to engine invocation component 142 which, illustratively, returns those results to the application (or entity). It can control user interface component 116 to update any user interface displays that need to be updated, based upon the returned information.

Figure 2:
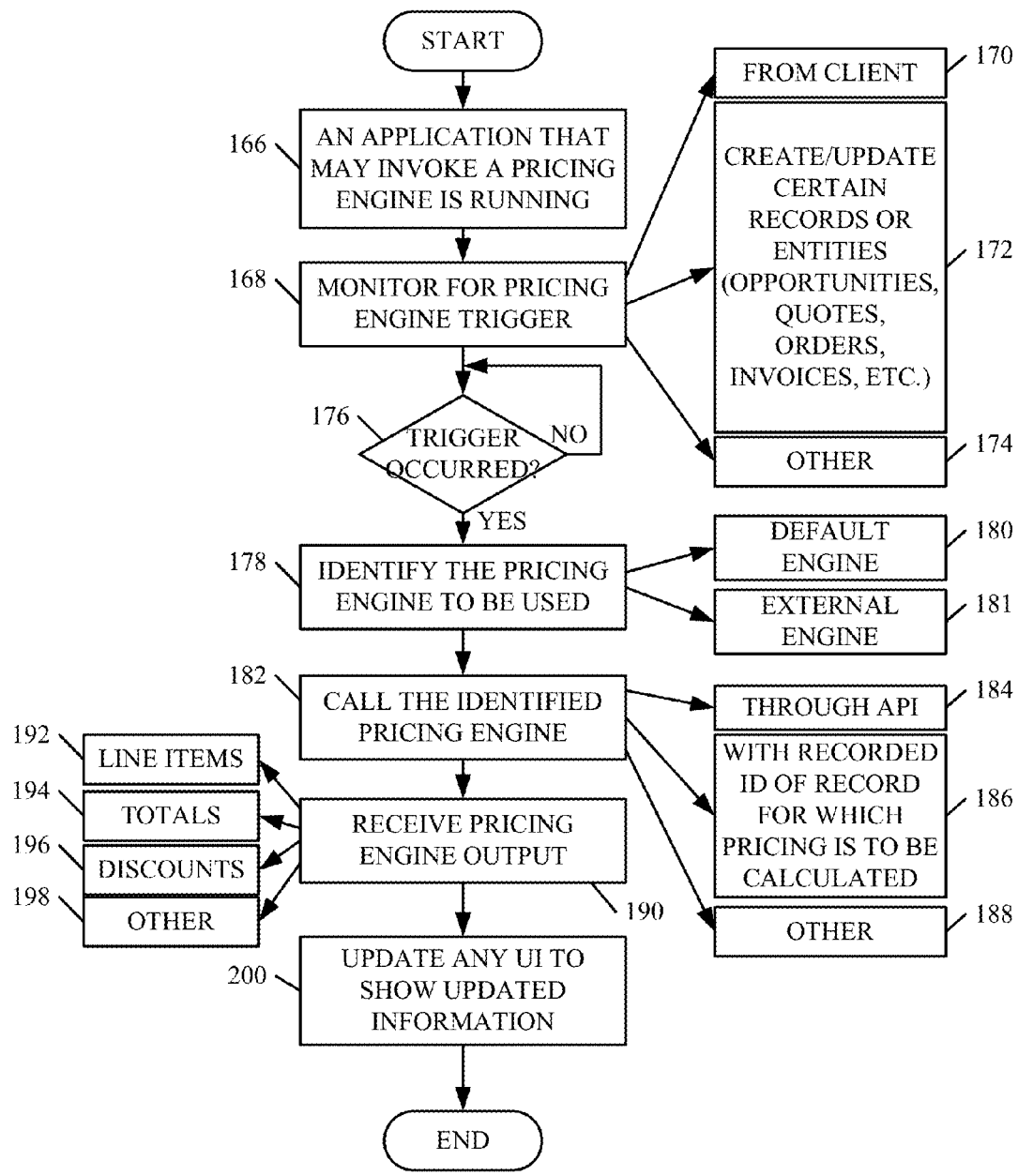
FIG. 2 is a flow diagram illustrating one example of the operation of the architecture shown in FIG. 1 in invoking an external engine.

FIG. 2 is a flow diagram illustrating one example of the operation of architecture 100, in more detail. It is assumed for the sake of the description of FIG. 2 that an application 130 that may invoke a pricing engine operation is already running. This is indicated by block 166 in FIG. 2. Engine trigger detecting component 140 then monitors the application for a pricing engine trigger. This is indicated by block 168. The trigger can come from a client browser or another client component, as indicated by block 170. The trigger can take a wide variety of forms, such as a user creating or updating certain records or entities, as indicated by block 172. In one example, the set of entities or records that trigger the pricing engine are predefined entities, such as opportunities, quotes, orders, invoices, etc. In another example, they may be entities that are customized or dynamically identified. Further, the trigger may include the conversion of a given entity from one form to another (such as the conversion of an opportunity entity to a quote entity), etc. All of these, and other triggers, are contemplated herein. This is indicated by block 174.

If a trigger has occurred, as indicated by block 176, then engine invocation component 142 invokes a pricing engine to obtain a calculation. In doing so, it first identifies the pricing engine to be used, such as by accessing the external engine ID 146 in extensibility component 144. This will identify the particular external pricing engine 104-106, that is to be used. This assumes, of course, that the default pricing engine 126 has been disabled, and is not to be used. Identifying the pricing engine to be used is indicated by block 178. Identifying the default engine is indicated by block 180 and identifying an external engine is indicated by block 181.

Engine invocation component 142 then calls the identified pricing engine, as indicated by block 182. It can do this by calling the identified engine through pricing engine API 124. This is indicated by block 184. It can also do this by calling the identified pricing engine with a record identifier identifying the particular record for which pricing is to be calculated. This is indicated by block 186. By way of example, the call may identify the particular invoice ID or quote ID or other entity ID that contains items for which pricing is to be calculated. It can invoke the identified pricing engine in other ways as well, and this is indicated by block 188.

The pricing engine that is invoked then accesses the particular document (e.g., entity) identified in the call and applies the particular set of pricing logic to generate the pricing calculations. The pricing logic can take a wide variety of different forms. For instance, a given organization may provide discounts to a set of customers. Therefore, the pricing logic may identify whether an invoice is for a given customer for which a discount is to be applied, and include that discount in the pricing calculation. The pricing logic may be customized by the administrators (or even the end users) to incorporate other discounts, such as volume discounts, group discounts, etc. It can be configured in such a way as to calculate pricing dynamically based upon a variety of different parameters as well.

In any case, the external pricing engine that has been called eventually returns the pricing information that it has calculated. Receiving the output of the pricing engine is indicated by block 190 in FIG. 2. The information can include a wide variety of different types of information, based upon the particular pricing engine and pricing logic applied. For instance, it can include pricing information on a per line item basis, as indicated by block 192. It can include totals, as indicated by block 194. It can include a wide variety of different types of discounts 196, and it can include a wide variety of other information as well, as indicated by block 198.

Engine invocation component 142 then returns that information to the application that has triggered it, and user interface component 116 can illustratively control a display device to update any user interface displays that need to be updated, based upon the information received from the external engine. Updating the UI to show updated information is indicated by block 200 in FIG. 2. By way of example, if a user 112 is generating a quote or an invoice for a customer, that quote or invoice may be updated to show the pricing information returned by the external engine.

Figure 3:
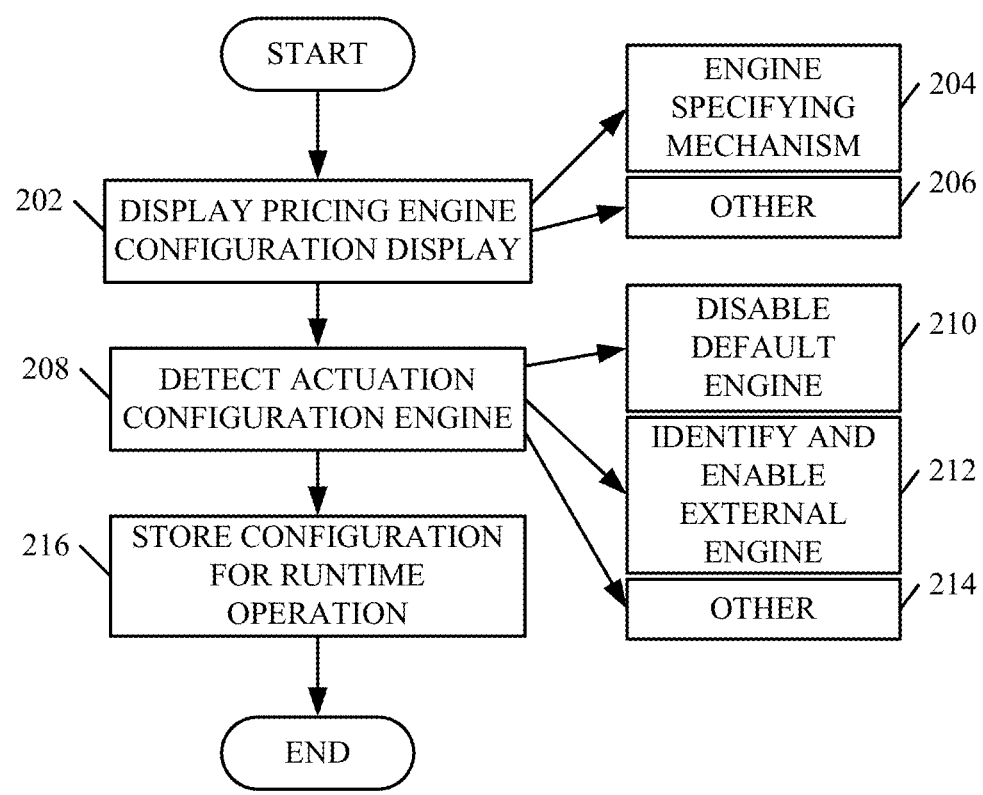
FIG. 3 is a flow diagram illustrating one example of the operation of the architecture shown in FIG. 1 in enabling engine configuration.

FIG. 3 is a flow diagram illustrating one example of the operation of extensibility UEX component 148 in allowing an administrative user 112 to specify a particular external pricing engine to be used by computing system 102. Component 148 first displays a pricing engine configuration display. This is indicated by block 202. It can include one or more engine specifying mechanisms 204 that can be actuated to specify the location, and identity, of a particular external pricing engine 104-106 that is to be used with computing system 102. It can include a wide variety of other items as well, and this is indicated by block 206 in FIG. 3.

Component 148 then detects actuation of the user input mechanisms that are used to configure the system to use a particular external pricing engine. Detecting actuation is indicated by block 208. The actuation can, for instance, disable default pricing engine 126, as indicated by block 210. It can identify and enable a given external pricing engine 104-106. This is indicated by block 212. It can perform a wide variety of other configuration actions as well, as indicated by block 214.

UEX component 148 then illustratively stores the configuration for runtime operation. This is indicated by block 216. For instance, it can store the external engine ID 146 (which may also include a location of that external engine). Thus, it can be accessed by engine invocation component 142, when an engine invocation is triggered. It can store the configuration for runtime operations in other ways as well.

It can thus be seen that the present system advantageously improves the operation of computing system 102. It makes the system 102 much more accurate because the system is performing desired calculations according to desired logic. In addition, it makes system 102 extensible so that it can easily call, and accept inputs from, external pricing engines. This can be done quickly and efficiently, without writing a great deal of extra code within computing system 102. It also advantageously increases the efficiency and performance of end users 112. They need not perform meticulous calculations, in generating pricing information. Further, they need not access multiple different documents or locations to obtain pricing information that is customized to their particular organization. Instead, the pricing information can all be encapsulated in a single external pricing engine, and the pricing logic that it uses to operate. Thus, this makes the operations by an end user much more efficient and accurate.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
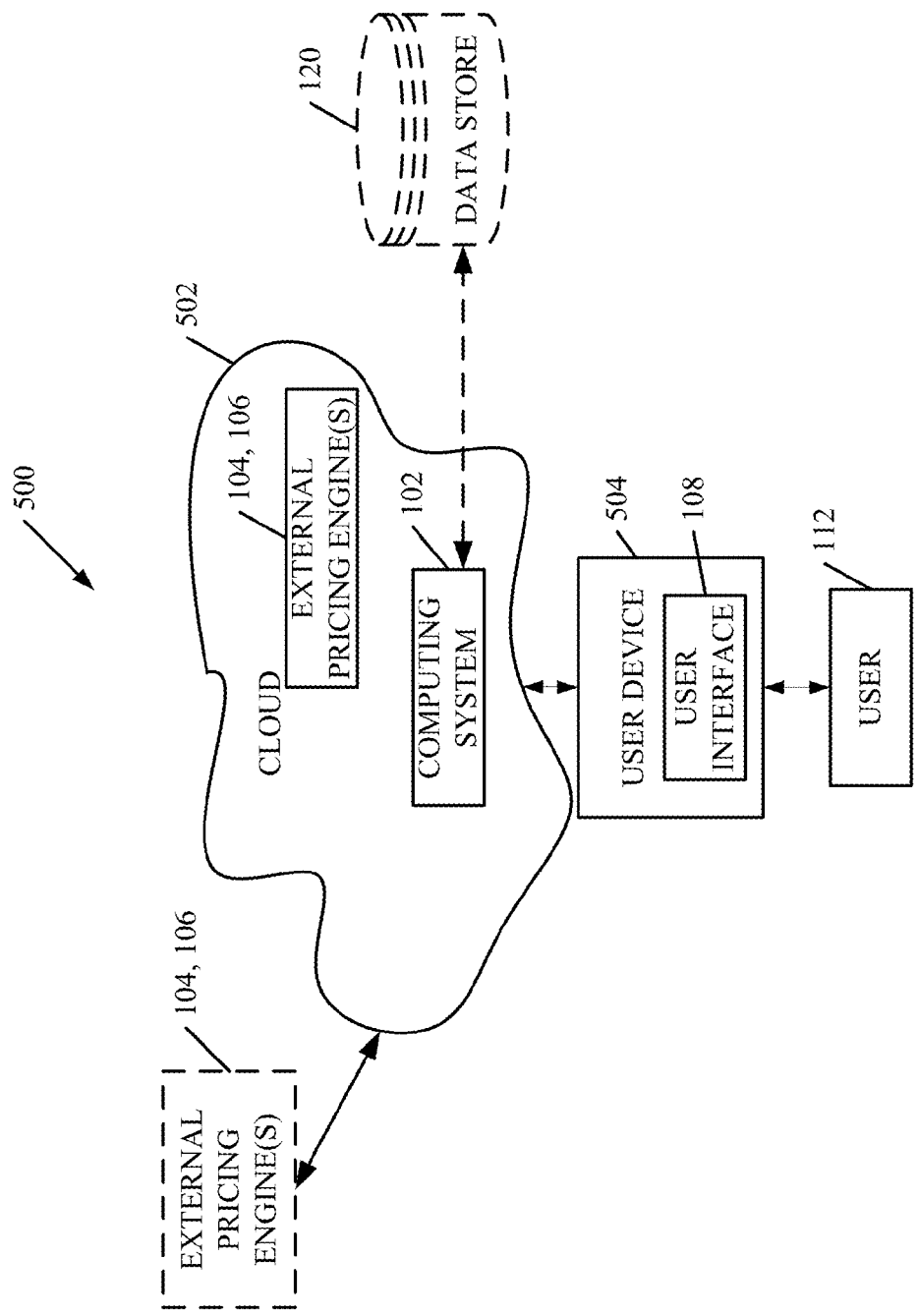
FIG. 4 is a block diagram of one example of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that system 102 and engines 104-106 can be in cloud 502 (which can be public, private, or a combination where portions are public while others are private). Therefore, user 112 uses a user device 504 to access those systems through cloud 502.

FIG. 4 also depicts another example of a cloud architecture. FIG. 4 shows that it is also contemplated that some elements of architecture 100 can be disposed in cloud 502 while others are not. By way of example, data store 120 can be disposed outside of cloud 502, and accessed through cloud 502. In another example, external pricing engines 104-106 or other items can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
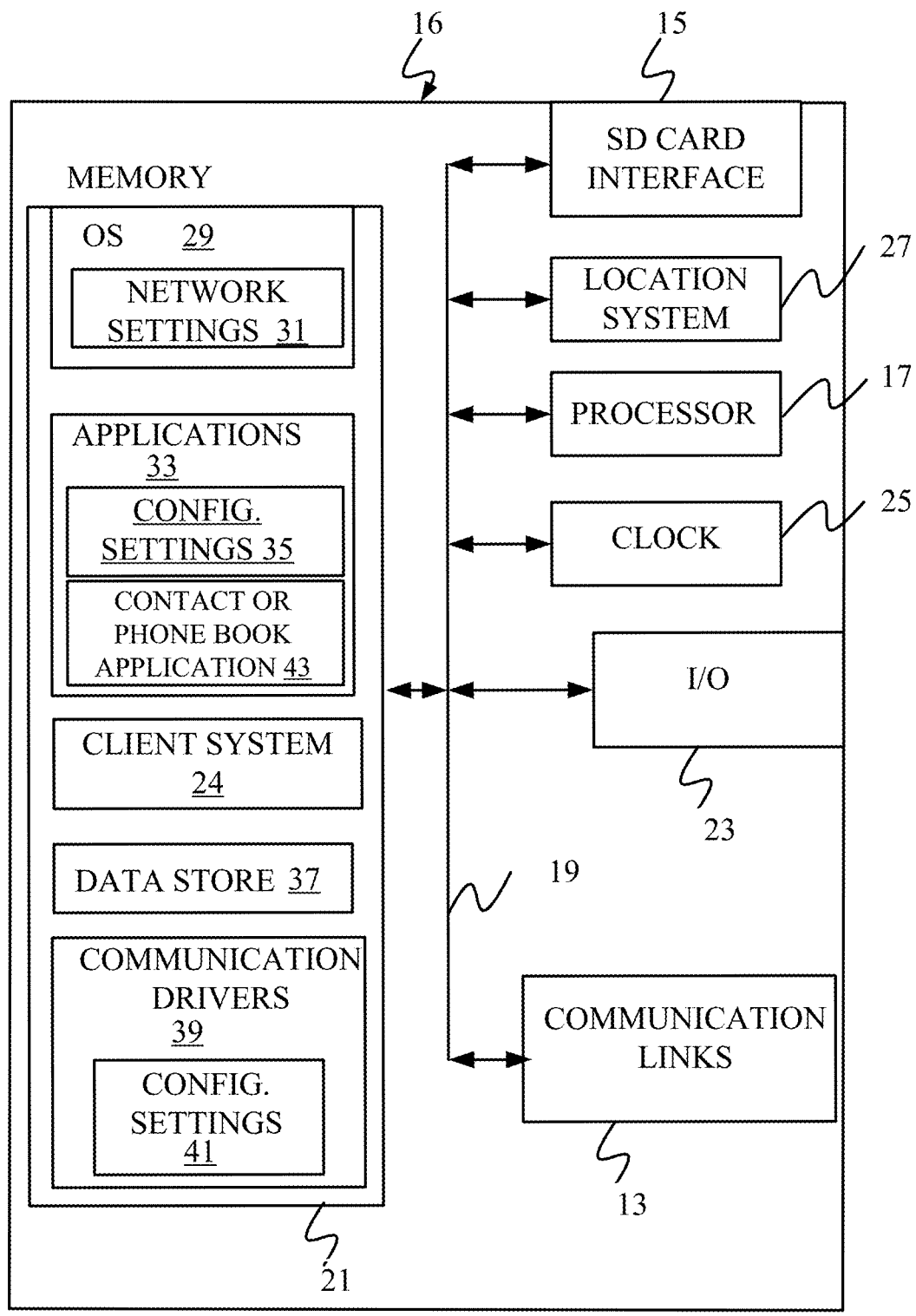
FIGS. 5-7 show examples of mobile devices that can be used in the architectures shown in the previous figures.
Figure 6:
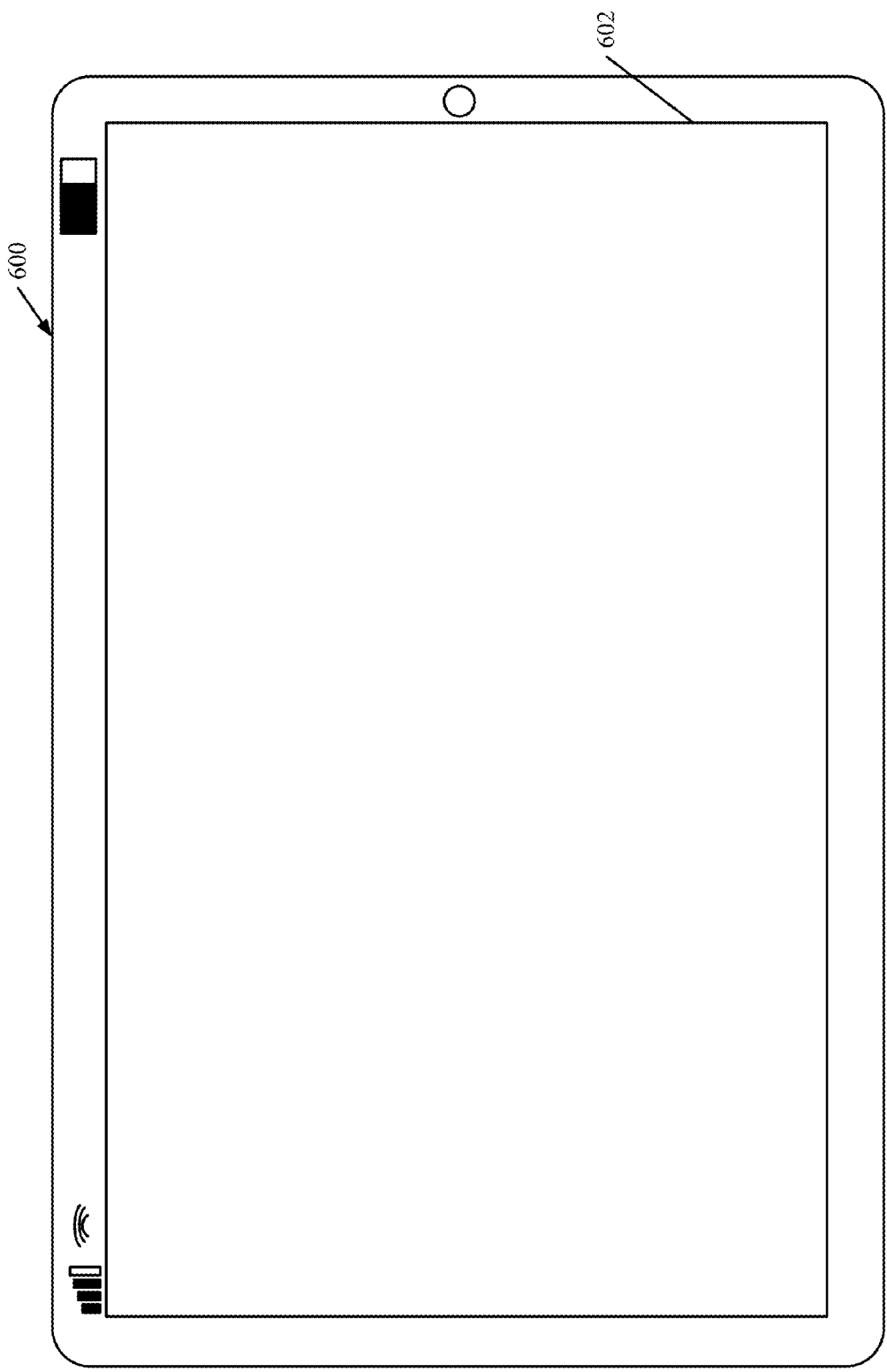
Figure 7:
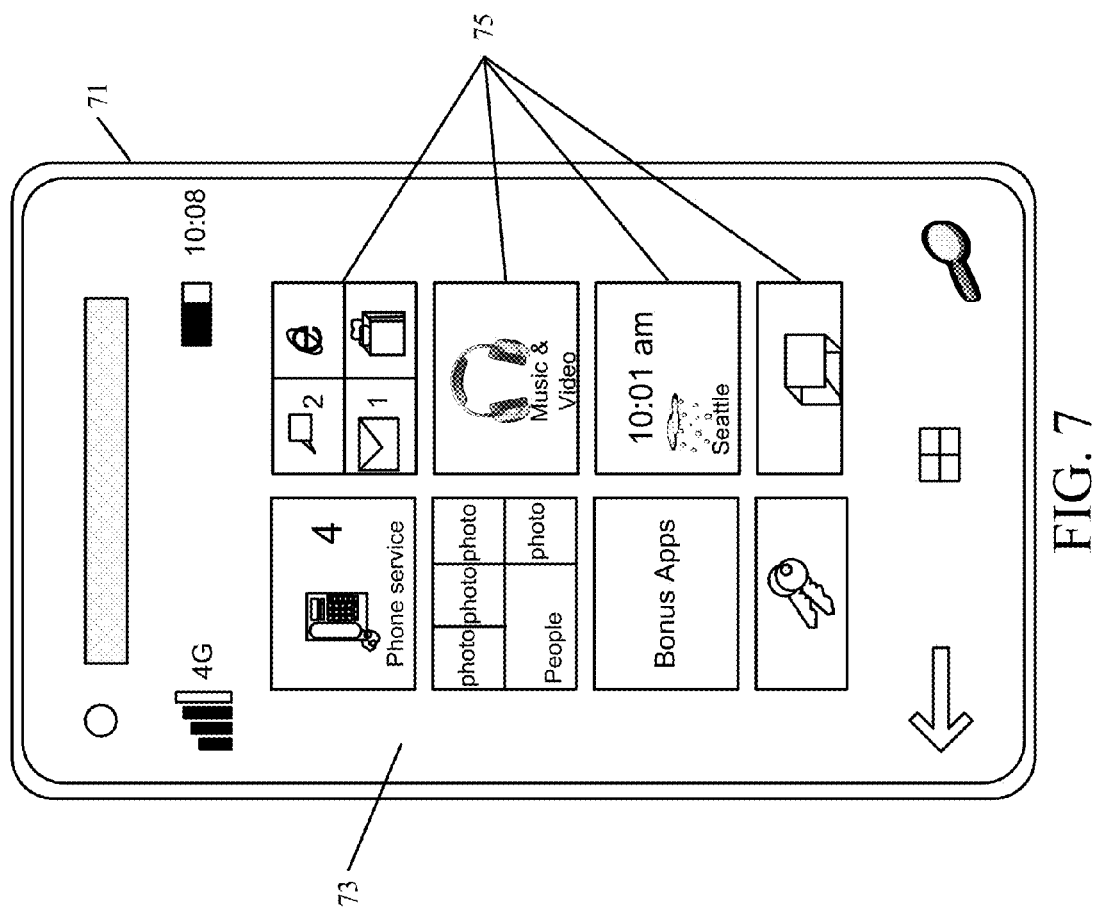

FIG. 5 is a simplified block diagram of one illustrative embodiment of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
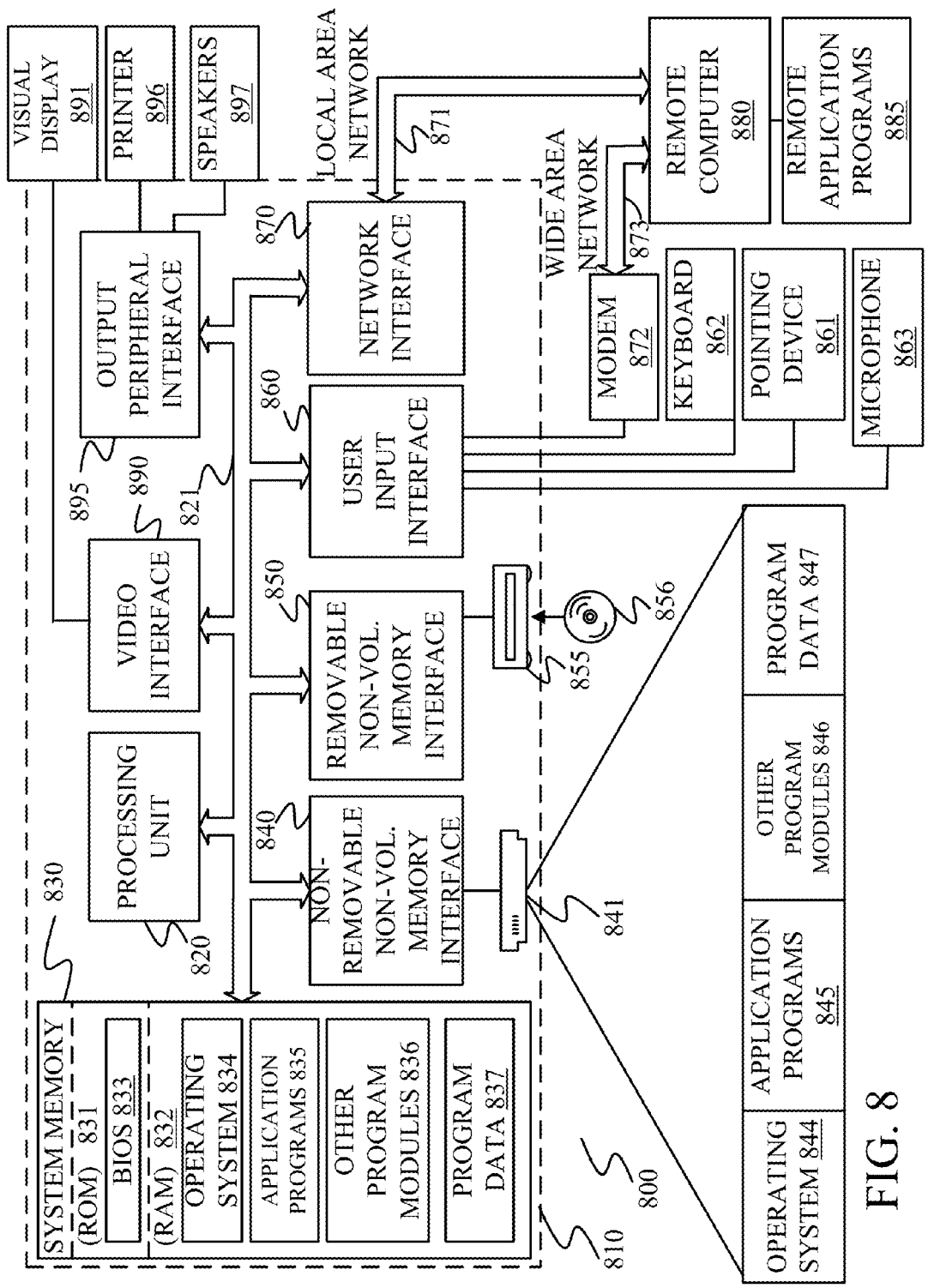
FIG. 8 is a block diagram of one example of a computing environment that can be used in the architectures shown in the previous figures.

FIG. 8 is one embodiment of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processor or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an application component that runs an application that operates on a record and that uses externally generated information on the record;

an extensible engine system that exposes an application programming interface (API) that, in response to a detected external engine trigger in the application, calls a given external engine, from a plurality of external engines, to generate the externally generated information and receives a return from the given engine with the externally generated information and provides the externally generated information to the application component for the record; and a user interface component that controls a display device to surface the externally generated information on the record.

Example 2 is the computing system of any or all previous examples wherein the extensible engine system comprises:

an engine trigger detecting component that detects an engine trigger in the application component indicative of a call for the externally generated information.

Example 3 is the computing system of any or all previous examples wherein the extensible engine system comprises:

an engine invocation component that invokes the given engine in response to the detection of the engine trigger.

Example 4 is the computing system of any or all previous examples wherein the extensible engine system comprises:

an extensibility user experience component that generates a user interface display with a configuration user input mechanism that is actuated to configure the engine invocation component to invoke the given engine.

Example 5 is the computing system of claim 4 wherein the extensibility user interface component stores an engine identifier identifying the given engine, in response to actuation of the configuration user input mechanism.

Example 6 is the computing system of any or all previous examples wherein the engine invocation component accesses the engine identifier to call the given engine through the API.

Example 7 is the computing system of any or all previous examples wherein the engine trigger detecting component detects an engine trigger in the application component indicative of creation or modification of a record, of a predetermined set of records, in the application.

Example 8 is the computing system of any or all previous examples wherein the engine trigger detecting component detects an engine trigger in the application component indicative of conversion of a first record having a first record type in the application to a second record having a second record type.

Example 9 is a computer implemented method, comprising:

running an application that operates on a record and that uses externally generated information;

detecting an external engine trigger in the application;

calling, through an exposed application programming interface (API) and in response to detecting the external engine trigger in the application, a given external engine, from a plurality of external engines, to generate the externally generated information receiving a return through the API from the given engine with the externally generated information;

providing the externally generated information to the application component for the record; and controlling a display device to surface the externally generated information on the record.

Example 10 is the computer implemented method of any or all previous examples wherein detecting an external engine trigger comprises:

detecting an engine trigger in the application component indicative of a call for the externally generated information.

Example 11 is the computer implemented method of any or all previous examples wherein detecting the engine trigger comprises:

detecting the engine trigger in the application indicative of creation or modification of a record, of a predetermined set of records, in the application.

Example 12 is the computer implemented method of any or all previous examples wherein detecting the engine trigger comprises:

detecting the engine trigger in the application indicative of conversion of a first record having a first record type in the application to a second record having a second record type.

Example 12 is the computer implemented method of any or all previous examples and further comprising:

generating a user interface display with a configuration user input mechanism that is actuated to configure the engine invocation component to invoke the given engine.

Example 13 is the computer implemented method of any or all previous examples and further comprising:

detecting actuation of the configuration user input mechanism; and storing an engine identifier identifying the given engine, in response to actuation of the configuration user input mechanism.

Example 14 is the computer implemented method of any or all previous examples wherein invoking the given engine comprises:

accessing the engine identifier; and calling the given engine through the API, with a record identifier identifying the record for which the externally generated information is to be generated.

Example 15 is a computing system, comprising:

an application component that runs an application that operates on a record and that uses externally generated information on the record;

an engine trigger detecting component that detects an engine trigger in the application component indicative of a call for the externally generated information;

an extensible engine system that exposes an application programming interface (API) that, in response to a detected external engine trigger in the application, calls a given external engine with a record identifier identifying the record, from a plurality of external engines, to generate the externally generated information and receives, from the given engine, the externally generated information and provides the externally generated information to the application component for the record; and a user interface component that controls a display device to surface the externally generated information on the record.

Example 16 is the computing system of any or all previous examples wherein the engine trigger detecting component detects an engine trigger in the application component indicative of creation or modification of a record, of a predetermined set of records, in the application.

Example 17 is the computing system of any or all previous examples wherein the engine trigger detecting component detects an engine trigger in the application component indicative of conversion of a first record having a first record type in the application to a second record having a second record type.

Example 18 is the computing system of any or all previous examples wherein the extensible engine system comprises:

an engine invocation component that invokes the given engine in response to the detection of the engine trigger.

Example 19 is the computing system of any or all previous examples wherein the extensible engine system comprises:

an extensibility user experience component that generates a user interface display with a configuration user input mechanism that is actuated to configure the engine invocation component to invoke the given engine.

Example 20 is the computing system of any or all previous examples wherein the extensibility user interface component stores an engine identifier identifying the given engine, in response to actuation of the configuration user input mechanism and wherein the engine invocation component accesses the engine identifier to call the given engine through the API.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
an application component configured to run an application that operates on a record having a first record type and that uses externally generated information on the record;
an engine trigger detecting component configured to detect an external engine trigger in the application indicative of conversion of the record from the first record type to a second record type;
an extensible engine system configured to:
expose an application programming interface (API) that, in response to the detected external engine trigger in the application, calls a given external engine, from a plurality of external engines, with a record identifier identifying the record;
receive, from the given external engine through the API, the externally generated information based on the call with the record identifier; and
provide the externally generated information to the application component the record; and
a user interface component configured to generate a representation of a user interface display that includes the externally generated information on the record.

2. The computing system of claim 1 wherein the engine trigger detecting component is configured to detect an engine trigger in the application component indicative of creation or modification of a record, of a predetermined set of records, in the application.

3. The computing system of claim 1 wherein the extensible engine system comprises:
an engine invocation component configured to invoke the given external engine in response to the detection of the external engine trigger.

4. The computing system of claim 3 wherein the extensible engine system comprises:
an extensibility user interface component configured to:
generate a representation of a user interface display with a configuration user input mechanism;
receive an indication of user actuation of the configuration user input mechanism; and
based on the indication of user actuation of the configuration user input mechanism, configure the engine invocation component to invoke the given external engine.

5. The computing system of claim 4 wherein the extensibility user interface component is configured to:
in response to the indication of user actuation of the configuration user input mechanism, store an engine indents er identifying the given external engine; and
wherein the engine invocation component is configured to access the engine identifier to call the given external engine through the API.

6. A computer-implemented method comprising:
running an application that operates on a record having a first record type and that uses externally generated information on the record;
detecting an external engine trigger in the application indicative of conversion of the record from the first record type to a second record type;
exposing, by an extensible engine system, an application programming interface (API);
calling, using the API in response to the detected external engine trigger in the application, a given external engine, from a plurality of external engines, with a record identifier identifying the record;
receiving, from the given external engine through the API, the externally generated information based on the call with the record identifier;
providing the externally generated information to the application component for the record; and
generating a representation of a user interface display that includes the externally generated information on the record.

7. The computer-implemented method of claim 6, and further comprising:
ng an engine trigger indicative of creation or modification of a record, of a predetermined set of records, in the application.

8. The computer-implemented method of claim 6, and further comprising:
invoking the given external engine in response to the detection of the external engine trigger.

9. The computer-implemented method of claim 6, and further comprising:
generating a representation of a user interface display with a configuration user input mechanism;
receiving an indication of user actuation of the configuration user input mechanism;
based on the indication of actuation of the configuration user input mechanism, configuring an engine invocation component,
invoking the given engine using the configured engine invocation component.

10. The computer-implemented method of claim 6, and further comprising:
in response to the indication of user actuation of the configuration user input mechanism, storing an engine identifier identifying the given external engine; and
accessing the engine identifier to call the given external engine through the API.

11. A computing system, comprising:
a processor; and
memory storing instructions executable by the processor, wherein the instructions, when executed, configure the computing system to:
run an application that operates on a record having a first record type and that uses externally generated information on the record;
detect an external engine trigger in the application indicative of conversion of the record from the first record type to a second record type;
expose an application programming interface (API);
call, using the API in response to the detected external engine trigger in the application, a given external engine, from a plurality of external engines, with a record identifier identifying the record;
receive, from the given external engine through the API, the externally generated information based on the call with the record identifier;
provide the externally generated information to the application component for the record; and generate a representation of a user interface that includes the externally generated information on the record.

12. The computing system of claim 11 wherein the instructions configure the computing system to:
detect an engine trigger indicative of creation or modification of a record, of a predetermined set of cords, in the application.

13. The computing system of claim 11 wherein the instructions configure the computing system to:
invoke the given external engine in response to the detection of the external engine trigger.

14. The computing system of claim 13 wherein the instructions configure the computing system to:
generate a representation of a user interface display with a configuration user input mechanism;
receive an indication of user actuation of the configuration user input mechanism;
based on the indication of user actuation of the configuration user input mechanism, configure an engine invocation component; and
invoke the given external engine using the configured engine invocation component.

15. The computing system of claim 14 wherein the instructions configure the computing system to:
in response to the indication of user actuation of the configuration user input mechanism, store an engine identifier identifying the given external engine; and
access the engine identifier to call the given external engine through the API.

* * * * *